(12) United States Patent
Nelson et al.

(10) Patent No.: US 8,236,874 B2
(45) Date of Patent: Aug. 7, 2012

(54) COMPOSITIONS AND METHOD FOR IMPROVING THE PROCESSING OF POLYMER COMPOSITES

(75) Inventors: James M. Nelson, Woodbury, MN (US); Jeffrey J. Cernohous, Hudson, WI (US); Siegmund Papp, Woodbury, MN (US); Neil R. Granlund, Columbia Heights, MN (US); Ryan E. Marx, Rosemount, MN (US); Jeffrey G. Linert, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1018 days.

(21) Appl. No.: 12/176,900

(22) Filed: Jul. 21, 2008

(65) Prior Publication Data

US 2009/0020914 A1 Jan. 22, 2009

Related U.S. Application Data

(63) Continuation-in-part of application No. 10/459,062, filed on Jun. 11, 2003, now Pat. No. 7,402,625.

(51) Int. Cl.
 *C08L 27/00* (2006.01)
 *C08K 11/00* (2006.01)
(52) U.S. Cl. ........... 523/122; 524/13; 524/15; 524/520
(58) Field of Classification Search ............. 523/122; 524/520, 13, 15
See application file for complete search history.

(56) References Cited

U.S. PATENT DOCUMENTS

| | | | |
|---|---|---|---|
| 3,125,547 A | 3/1964 | Blatz | |
| 4,575,533 A | 3/1986 | Horie et al. | |
| 5,015,693 A | 5/1991 | Duchesne et al. | |
| 5,155,169 A | 10/1992 | de Jong et al. | |
| 5,284,184 A | 2/1994 | Noone et al. | |
| 5,587,429 A | 12/1996 | Priester | |
| 5,707,569 A | 1/1998 | Priester et al. | |
| 5,830,947 A | 11/1998 | Blong et al. | |
| 5,854,352 A | 12/1998 | Chisholm et al. | |
| 6,093,772 A | 7/2000 | Bussi | |
| 6,172,180 B1 | 1/2001 | Hancock et al. | |
| 6,277,919 B1 | 8/2001 | Dillon et al. | |
| 6,380,313 B1 | 4/2002 | Dillon et al. | |
| 6,448,253 B1 | 9/2002 | Baraldi | |
| 6,448,353 B1 * | 9/2002 | Nelson et al. | 526/265 |
| 6,552,131 B1 | 4/2003 | Higuchi et al. | |
| 6,903,173 B2 | 6/2005 | Cernohous et al. | |
| 2004/0024130 A1 | 2/2004 | Nelson et al. | |
| 2004/0110884 A1 * | 6/2004 | Dontula et al. | 524/445 |

FOREIGN PATENT DOCUMENTS

| | | |
|---|---|---|
| CA | 2176057 | 9/1997 |
| CN | 1257890 A | 6/2000 |
| JP | 57-187338 | 11/1982 |
| JP | 3-22307 | 1/1991 |
| JP | 7-53838 | 2/1995 |
| JP | 2001-31799 | 2/2001 |
| JP | 2002-327124 | 11/2002 |
| WO | WO 00/47652 A1 | 8/2000 |
| WO | WO 02/083824 A1 | 10/2002 |

OTHER PUBLICATIONS

Hsieh H. L., et al., "Anionic Polymerization Principles and Applications," Living Polymerizations, 1996, pp. 71-127.
Rauwendaal, C., "Polymer Extrusion", Hansen Publishers, p. 23-48, 1986.

\* cited by examiner

*Primary Examiner* — Kriellion Sanders
(74) *Attorney, Agent, or Firm* — Lisa P. Fulton

(57) ABSTRACT

A composition that employs a coupling agent with a fluoropolymer processing aid to address melt-processing issues related to the use of interfering components in melt-processable polymeric binders.

12 Claims, No Drawings

COMPOSITIONS AND METHOD FOR IMPROVING THE PROCESSING OF POLYMER COMPOSITES

CROSS REFERENCE TO RELATED APPLICATIONS

This application is a continuation-in-part of U.S. application Ser. No. 10/459,062, filed Jun. 11, 2003, now issued as U.S. Pat. No. 7,402,625, the disclosure of which is incorporated by reference in its entirety.

FIELD OF THE INVENTION

The present invention relates to compositions and a method for improving the melt processing of polymeric materials, and more particularly to the use of polymer processing aids combined with coupling agents to enhance the melt processing of polymeric materials that include fillers.

BACKGROUND OF THE INVENTION

Fluoropolymers are often utilized as processing aids in the melt processing of polymeric materials, such as polyolefins. The polymeric materials possess certain viscoelastic characteristics that, when melt processed, may result in undesirable defects in the finished material. This is particularly evident in extrusion processes for a given extrudable polymer where there exists a critical shear rate above which the surface of the extrudate exhibits melt defects. The melt defects may be present as a rough surface on the extrudate, commonly referred to as melt fracture. Melt fracture is primarily a function of the rheology of the polymer and the temperature and speed at which the polymer is processed. Melt fracture may take the form of "sharkskin", a loss of surface gloss, that in more serious manifestations appears as ridges running more or less transverse to the extrusion direction. The extrudate may, in more severe cases, undergo "continuous melt fracture" where the surface becomes grossly distorted.

Fluoropolymers are capable of alleviating melt fracture in many polymeric materials. The fluoropolymers are incorporated into the polymeric materials in an amount generally of about 2% by weight or less.

Melt processable polymeric materials, hereinafter referred to as polymeric binders, are often combined with certain fillers or additives to both enhance the economics and to impart desired physical characteristics to the processed material. The fillers may include various organic material or inorganic material mixed throughout the polymeric host material. For example, wood flour or wood fibers are often included with certain hydrocarbon polymers to make a composite that is suitable as structural building material upon melt processing.

The incorporation of conventional fillers and additives may adversely affect the efficacy of the fluoropolymers incorporated into the melt processable mixture as a processing aid. Such fillers can interfere with the ability of the fluoropolymer to reduce melt fracture. Thus, melt fracture may occur at processing speeds that are undesirably low. Additionally, an increase of the amount of processing aid in the polymeric mixture does not reduce the melt fracture of the polymeric material to acceptable levels. For purposes of the present invention, the fillers and additives hereinafter will be referred to as interfering components.

SUMMARY OF THE INVENTION

The present invention is directed to addressing the problem created through the use of interfering components in melt processable polymeric binders and the interfering component's adverse affect on the performance of conventional polymer processing aids. The utilization of the present invention reduces the melt fracture generally experienced when melt processing polymeric binders with interfering components.

In one aspect of the invention, a composition having a controlled polymer architecture is employed as a coupling agent in combination with a polymer processing aid. The combination when applied with a polymeric binder and an interfering component is capable of significantly reducing melt fracture in melt processable admixtures. Additionally, improved physical properties such as tensile strength, flexural modulus, water uptake may also be realized.

Coupling agents may include block copolymers. Block copolymers generally include di-block copolymers, tri-block copolymers, random block copolymers, graft-block copolymers, star-branched block copolymers or hyper-branched block copolymers. Preferably, the block copolymers are amphiphilic block copolymers.

Polymer processing aids are those fluoropolymers generally recognized in the melt processing field as being capable of improving melt processability of polymers. The fluoropolymers may be thermoplastic or elastomeric materials. Preferred fluoropolymers include homopolymers or copolymers derived from vinylidene difluoride, hexafluoropropylene, and tetrafluoroethylene monomers. Additionally, other conventional additives may be included with the fluoropolymer to impart specific functional features.

Polymer processing aids improve the processing efficiency of polymeric products including film, sheet, pipe, wire and cable. The additive polymer processing aids at low levels into a formulation may improve surface quality of the product by eliminating surface defects like melt fracture, prevent the occurrence of internal or external die build up, and reduce or eliminate the formation of processing induced gels particles. The present invention may also lower the pressure in the melt and the apparent viscosity of the polymer melt and thus positively impact overall extrudate throughput or allow lower processing temperatures to be utilized. Lower processing temperatures may have a beneficial impact on extrudate color.

Conventionally recognized polymeric binders and interfering components may be utilized to form the polymeric mixture suitable for melt processing. The polymeric binders may be either hydrocarbon or non-hydrocarbon polymers. Preferably, the polymeric binder is an olefin-based polymer. The interfering components are those generally organic or inorganic materials utilized as fillers or additives in the polymer composite industry.

In another aspect of the invention, a preferred cellulosic material serves as the interfering component in the polymeric binder to form a polymeric mixture. In this aspect, the coupling agent incorporated into the melt processable material may include grafted polyolefins, di-block copolymers, tri-block copolymers, graft-block copolymers, random block copolymers, star-branched block copolymers, hyper-branched block copolymers, or silanes. Combinations of the noted coupling agents may also be employed with the polymer processing aid to reduce melt fracture of the polymeric binder during melt processing.

The present invention also contemplates methods for melt processing the novel compositions. Non-limiting examples of melt processes amenable to this invention include methods such as extrusion, injection molding, batch mixing and roto-molding.

The polymer processing aid and the coupling agent improve the melt processability of polymer composite systems. In particular, the present invention substantially improves the melt processability of interfering components that generally have a strong interfacial tension with polymeric binders. The novel combination enables a significant reduction in the interfacial tension between the polymeric binder and the interfering component thus resulting in an improved efficacy of the polymer processing aid. The resulting processed material exhibits a significant reduction in melt fracture as well as improved physical characteristics such as water uptake, flexural modulus, or tensile strength.

For purposes of the present invention, the following terms used in this application are defined as follows:

"Polymer processing aid" means a thermoplastic or elastomeric fluoropolymer that is capable of improving polymer processing, for example, reducing melt fracture.

"Polymeric binder" means a melt processable polymeric material.

"Interfering component" means a material that has a negative impact on polymer processing aid efficacy when incorporated with a polymeric binder.

"Coupling agent" means a material added to a polymer formulation to reduce interfacial tension between the polymer and the interfering component.

"Controlled polymer architecture" means block copolymers or block copolymers and polymers having a functional group on one chain end.

"Melt processable composition" means compositions or materials that are capable of withstanding processing conditions at temperatures near the melting point of at least one composition in a mixture.

"Block copolymer" means a polymer having at least two compositionally discrete segments, e.g. a di-block copolymer, a tri-block copolymer, a random block copolymer, a graft-block copolymer, a star-branched block copolymer or a hyper-branched block copolymer.

"Random block copolymer" means a copolymer having at least two distinct blocks wherein at least one block comprises a random arrangement of at least two types of monomer units.

"Di-block copolymers or Tri-block copolymers" means a polymer in which all the neighboring monomer units (except at the transition point) are of the same identity, e.g.,—AB is a di-block copolymer comprised of an A block and a B block that are compositionally different and ABC is a tri-block copolymer comprised of A, B, and C blocks, each compositionally different.

"Graft-block copolymer" means a polymer consisting of a side-chain polymers grafted onto a main chain. The side chain polymer can be any polymer different in composition from the main chain copolymer.

"Star-branched block copolymer" or "Hyper-branched block copolymer" means a polymer consisting of several linear block chains linked together at one end of each chain by a single branch or junction point, also known as a radial block copolymer.

"End functionalized" means a polymer chain terminated with a functional group on at least one chain end.

"Amphiphilic block copolymer" means a copolymer having at least two compositionally discrete segments, where one is hydrophilic and one is hydrophobic.

DETAILED DESCRIPTION OF THE INVENTION

The compositions of the present invention reduce the melt fracture encountered when melt processing polymeric binders containing interfering components. A coupling agent is employed in the melt processable composition in order to reduce interfacial tension between the polymeric binder and the interfering component. Thus the use of the coupling agent permits the fluoropolymer to function as intended thereby reducing melt fracture.

For purposes of the invention, melt processable compositions are those that are capable of being processed while at least a portion of the composition is in a molten state. Conventionally recognized melt processing methods and equipment may be employ in processing the compositions of the present invention. Non-limiting examples of melt processing practices include extrusion, injection molding, batch mixing, and rotomolding.

The polymeric binder functions as the host polymer of the melt processable composition. A wide variety of polymers conventionally recognized in the art as suitable for melt processing are useful as the polymeric binder. The polymeric binder includes substantially non-fluorinated polymers that are sometimes referred to as being difficult to melt process. They include both hydrocarbon and non-hydrocarbon polymers. Examples of useful polymeric binders include, but are not limited to, polyamides, polyimides, polyurethanes, polyolefins, polystyrenes, polyesters, polycarbonates, polyketones, polyureas, polyvinyl resins, polyacrylates and polymethylacrylates.

Preferred polymeric binders include polyolefins (high density polyethylene (HDPE), low density polyethylene (LDPE), linear low density polyethylene (LLDPE), polypropylene (PP)), polyolefin copolymers (e.g., ethylene-butene, ethylene-octene, ethylene vinyl alcohol), polystyrenes, polystyrene copolymers (e.g., high impact polystyrene, acrylonitrile butadiene styrene copolymer), polyacrylates, polymethacrylates, polyesters, polyvinylchloride (PVC), fluoropolymers, liquid crystal polymers, polyamides, polyether imides, polyphenylene sulfides, polysulfones, polyacetals, polycarbonates, polyphenylene oxides, polyurethanes, thermoplastic elastomers, epoxies, alkyds, melamines, phenolics, ureas, vinyl esters or combinations thereof. Most preferred are the polyolefins.

The polymeric binder is included in the melt processable compositions in amounts of about typically greater than about 30% by weight. Those skilled in the art recognize that the amount of polymeric binder will vary depending upon, for example, the type of polymer, the type of interfering component, the processing equipment, processing conditions and the desired end product.

Useful polymeric binders include blends of various thermoplastic polymers and blends thereof containing conventional additives such as antioxidants, light stabilizers, fillers, antiblocking agents, and pigments. The polymeric binder may be incorporated into the melt processable composition in the form of powders, pellets, granules, or in any other extrudable form.

The interfering component is generally any conventional filler or additive utilized in melt processing compositions that may adversely affect the efficacy of conventional polymer processing aids. In particular, interfering components may substantially affect the melt fracture of a melt processable composition. Non-limiting examples of interfering components include pigments, carbon fibers, hindered amine light stabilizers, anti-block agents, glass fibers, carbon black, aluminum oxide, silica, mica, cellulosic materials, or one or more polymers with reactive or polar groups. Examples of polymers with reactive or polar groups include, but are not limited to, polyamides, polyimides, functional polyolefins, polyesters, polyacrylates and methacrylates.

In one aspect of the invention, the interfering component is a cellulosic material. Cellulosic materials are commonly utilized in melt processable compositions to impart specific physical characteristics to the finished composition. Cellulosic materials generally include natural or wood materials having various aspect ratios, chemical compositions, densities, and physical characteristics. Non-limiting examples of cellulosic materials include wood flour, wood fibers, sawdust, wood shavings, newsprint, paper, flax, hemp, rice hulls, kenaf, jute, sisal, peanut shells. Combinations of cellulosic materials, or cellulosic materials with other interfering components, may also be used in the melt processable composition.

The amount of the interfering components in the melt processable composition may vary depending upon the polymeric binder and the desired physical properties of the finished composition. Those skilled in the art of melt processing are capable of selecting an appropriate amount of an interfering component to match a polymeric binder in order to achieve desired physical properties of the finished material. Typically, the interfering component may be incorporated into the melt processable composition in amounts up to about 80% by weight. Additionally, the interfering component, or components, may be provided in various forms depending on the specific polymeric binders and end use applications.

In accordance with the present invention, the combination of a coupling agent with a polymer processing aid significantly enhances the melt processing of a polymeric binder, particularly in the presence of an interfering component. In one aspect of the invention, a block copolymer coupling agent is employed with the polymer processing aid. In another aspect, a cellulosic interfering component is included in the melt processable composition along with the coupling agent and the polymer processing aid.

Conventionally recognized polymer processing aids may be suitable for use in the present invention. The polymer processing aids of this invention are generally formed by polymerizing one or more fluorinated olefinic monomers. Non-limiting examples of specific polymer processing aids, and the methods for producing those materials, are included in U.S. Pat. Nos. 5,830,947, 6,277,919 B1, and 6,380,313 B1, all herein incorporated by reference in their entirety. The resulting process aid contains greater than 50 weight percent fluorine, preferably greater than 60 weight percent, even more preferably greater than 65 weight percent.

The fluoropolymers made in this manner from these constituent olefin monomers may be either crystalline, semi-crystalline or amorphous in nature, though the preferred fluoropolymer process aids are crystalline or semi-crystalline. Additionally, the fluoropolymers may be bimodal as identified in U.S. Pat. No. 6,277,919, previously incorporated by reference.

The fluoropolymers should also contain essentially no ethylenic unsaturations because ethylenic unsaturations in the fluoropolymer may be sites for chemical attack by additives or other components present in the melt processable composition. This means that the fluoropolymers will contain very little ethylenic unsaturation (e.g., carbon-carbon double bonds) along their backbone or in their pendant chains or groups. While very low levels of ethylenic unsaturation in the fluoropolymer process aid may be tolerated without substantial effect in this invention, higher levels cannot be tolerated without risking the chemical stability of its fluoropolymer process aid.

Elastomeric or semi-crystalline fluoropolymers used in the invention should readily flow under the processing conditions of the polymeric binder or into which it is admixed. In matching the polymer process aid with a thermoplastic hydrocarbon polymeric binder, the fluoropolymer preferably should be chosen such that its melt viscosity matches or is about the same as the melt viscosity of the hydrocarbon polymer. For such matching, the polymer process aid can be selected such that the ratio of its melt viscosity to the melt viscosity of the thermoplastic hydrocarbon polymer is in the range of ratios from 0.01 to 100, more preferably in the range from 0.02 to 20, most preferably in the range between 0.05 and 5.

Crystalline fluoropolymers, for example polytetrafluoroethylene, used in the invention typically do not melt under conventional processing conditions. However, the crystalline fluoropolymers are capable of improving melt processability. Preferred levels of crystalline fluoropolymers are in the range of 0.1% to 3% by weight, and most preferably 0.25% to 1.0% by weight.

Preferred polymer process aids include one or more fluoropolymers with interpolymerized units derived from one or more monomers of tetrafluoroethylene, hexafluoropropylene, and vinylidene fluoride. With the preferred cellulosic interfering component, a polytetrafluoroethylene (PTFE) polymer processing aid is most preferred.

The amount of polymer processing aid present in the melt processable composition is dependent upon several variables, such as for example, the polymeric binder, the type and amount of interfering component, the type of melt processing equipment, the processing conditions, and others. Those of skill in the art are capable of selecting an appropriate amount of polymer processing aid to achieve the desired reduction of melt fracture. In a preferred embodiment, the polymer processing aid is used at 0.05 to 3.0% by weight of the composite. More preferably, the polymer processing aid level is between 0.1 and 2.0% and even more preferably between 0.25 and 1.0%.

Optionally, the polymer processing aid may contain lubricants that are utilized to impart specific performance or physical characteristics to either the polymer processing aid or the melt composition during melt processing. Non-limiting examples of lubricants include polyoxyalylene, polyolefin waxes, stearates, and bis-stearamides. A preferred embodiment is a composition containing polyoxyalkylene at 0.1 to 2.0 weight percent, more preferably 0.25 to 1.0 weight percent.

A coupling agent is a material added to a composite system comprised of a polymeric binder and an interfering component. In this invention, the combination of a coupling agent with a polymer processing aid has been found to have surprising synergistic effects. Although polymer processing aids are known in the art for their utility in improving the processability (i.e., increased throughput, reduced melt fracture) of thermoplastics when added at low levels (i.e., 200 to 2500 ppm), it has been found here that such materials can be highly ineffective in melt processable compositions containing an interfering component. Such interfering components can strongly interact with the polymer processing aid, thus rendering it ineffective by preventing it from coating the extruder and die wall during melt processing.

Preferred coupling agents of this invention include: functional polyolefins, silanes, titanates, zirconates, compositions having controlled polymer architecture, or combinations thereof. More preferred coupling agents of this invention include compositions having controlled polymer architecture.

Non-limiting examples of preferred compositions having controlled polymer architecture include di-block copolymers, tri-block copolymers, random block copolymers, graft-block copolymers, star-branched copolymers or hyper-branched copolymers. Additionally, block copolymers may have end functional groups.

Most preferred coupling agents of this invention are amphiphilic block copolymers. Amphiphilic block copolymers contain polar or reactive block and a non-polar block. Non-limiting examples of such materials include polystyrene-b-methacrylic anhydride, polystryrene-b-4-vinylpyridine, polyisoprene-b-methacrylic anhydride, polyisoprene-b-4-vinylpyridine, polybutadiene-b-methacrylic anhydride, polybutadiene-b-4-vinylpyridine, polyethylene-b-methacrylic anhydride, polyethylene-b-4-vinylpyridine, polyethylene-propylene-b-methacrylic anhydride, polyethylene-propylene-b-4-vinylpyridine, polystearylmethacrylate-b-methacrylic anhydride, polystearylmethacrylate-b-4-vinylpyridine, polybehenylmethacrylate-b-methacrylic anhydride, polybehenylmethacrylate-b-4-vinylpyridine or combinations thereof.

Non-limiting examples of specific block copolymer coupling agents, and the methods for producing those materials, are included in U.S. patent application Ser. No. 10/211,415, U.S. patent application Ser. No. 10/211,096, U.S. Pat. No. 6,448,353, and *Anionic Polymerization Principles and Applications*. H. L. Hsieh, R. P. Quirk, Marcel Dekker, NY, N.Y. 1996. Pg 72-127); all herein incorporated by reference in their entirety.

Polymers may be end-functionalized polymeric materials that may be synthesized by using functional initiators or by end-capping living polymer chains, as conventionally recognized in the art. The end-functionalized polymeric materials of the present invention may comprise a polymer terminated with a functional group on at least one chain end. The polymeric species may be a homopolymers, copolymers, or block copolymers. For those polymers that have multiple chain ends, the functional groups may be the same or different. Non-limiting examples of functional groups include amine, anhydride, alcohol, carboxylic acid, thiol, maleate, silane, and halide. End-functionalization strategies using living polymerization methods known in the art can be utilized to provide these materials.

The amount of coupling agent is dependent upon several variables, including the type and amount of interfering components, type and amount of polymeric binder, processing equipment and conditions. The preferred level of coupling agent ranges from greater than 0 to about 10 parts by weight of the composite. However, a more preferred coupling agent range is 0.05 to about 2 wt %.

In a most preferred embodiment of this invention, the polymeric binder is a polyolefin and the interfering component is a cellulosic material. The preferred coupling agent for such a composite is an amphiphilic block copolymer and the preferred polymer processing additive is a fluorothermoplastic. The cellulosic material typically comprises 20 to 70 wt % of the overall composite in this instance. The coupling agent and polymer processing additive are each loaded at levels between 0.1 and 1.0 wt %. Such wood composites find utility in a variety of commercial applications as building products and automotive components. One example is the use of such composites in residential and commercial decking applications.

In an alternative embodiment, conventional antimicrobial compositions may be added to the melt processing composition of the present invention. Antimicrobial compositions suitable for use with the present invention include those that are capable of withstanding the melt processing environment. Non-limiting examples of antimicrobials include thiabendazole, 2-(4-thiazolyl)benzimidazol, zinc pyrithione, zinc bis (2-pyridinethiol-1-oxide), zinc borate, barium metaborate, N-butyl-1,2-benzisothiazolin-3-one, 2-n-Octyl-4-isothiazolin-3-one, tetrachloroisophthalonitrile, 10,10'-Oxybisphenoxyarsine, N'-dichlorofluoromethylthio-N,N-dimethyl-N' (p-tolyl)-sulfamide, N-(trichloromethylthio)phthalimide, and 3-iodo-2-propynyl-n-butylcarbamate.

The melt processable composition of the invention can be prepared by any of a variety of ways. For example, the polymeric binder and the polymer processing additive can be combined together by any of the blending means usually employed in the plastics industry, such as with a compounding mill, a Banbury mixer, or a mixing extruder in which the processing additive is uniformly distributed throughout the host polymer. The processing additive and the host polymer may be used in the form, for example, of a powder, a pellet, or a granular product. The mixing operation is most conveniently carried out at a temperature above the melting point or softening point of the fluoropolymer, though it is also feasible to dry-blend the components in the solid state as particulates and then cause uniform distribution of the components by feeding the dry blend to a twin-screw melt extruder. The resulting melt-blended mixture can be either extruded directly into the form of the final product shape or pelletized or otherwise comminuted into a desired particulate size or size distribution and fed to an extruder, which typically will be a single-screw extruder, that melt-processes the blended mixture to form the final product shape.

Melt-processing typically is performed at a temperature from 180° to 280° C., although optimum operating temperatures are selected depending upon the melting point, melt viscosity, and thermal stability of the blend. Different types of melt processing equipment, such as extruders, may be used to process the melt processable compositions of this invention. Extruders suitable for use with the present invention are described, for example, by Rauwendaal, C., "Polymer Extrusion," Hansen Publishers, p. 23-48, 1986. The die design of an extruder can vary, depending on the desired extrudate to be fabricated. For example, an annular die can be used to extrude tubing, useful in making fuel line hose, such as that described in U.S. Pat. No. 5,284,184 (Noone et al.), which description is incorporated herein by reference in its entirety.

The present invention enhances the melt processing of polymeric binders combined with interfering components. The coupling agent reduces the interfacial tension between the polymeric binders and the interfering component thereby permitting the polymer processing aid to provide a significant reduction in melt fracture of the processed composition.

The compositions of the present invention also enhance the physical properties of the processed material. For example, the processed material may exhibit improvements in water uptake, flexural modulus, or tensile strength. In a preferred embodiment, when the polymeric binder is polyethylene and the interfering component is a cellulosic material, the composition having at least one of a water uptake value of 3% or less, a flexural modulus of 2200 MPa or greater, or a tensile strength of 36 MPa or greater.

The melt processable compositions may be utilized to make items such as building materials and automotive components. Non-limiting examples include, residential decking and automotive interior components. Additionally, the compositions of the present invention may be used in film, sheet, pipe, wire or cable applications The invention is further illustrated in the following examples.

EXAMPLES

| Materials Used | |
|---|---|
| Material | Description |
| HDPE | BH-53-35H, a high density polyethylene, commercially available from Solvay, Houston, TX |
| Wood Flour | Oak wood flour, grade 4037, commercially available from American Wood Fiber, Schofield, WI |
| Lubricant Package | A 50/50 blend of zinc stearate and ethylene bis-stearamide, each commercially available from Aldrich Chemical Co., Milwaukee, WI. |
| Carbowax 8000 | A polyethylene glycol, commercially available from Dow Chemical Co., Midland, MI. |
| HALS | Chimassorb 944, a hindered-amine light stabilizer, commercially available from Ciba Specialty Chemicals Corp., Tarrytown, NY. |
| Antiblock | Optiblock 10, commercially available from Specialty Minerals, Easton, PA. |
| Pigment | Kronos 2075, commercially available from Kronos Inc., Houston, TX. |
| ODMA-b-C4-b-$^t$BMA | An ABC triblock copolymer, poly[octadecyl methacrylate-b-2-(N-methylperfluorobutanesulfonamido)ethyl methacrylate-b-tert-butyl methacrylate]. Synthesized using a stirred tubular reactor process as described in U.S. Pat. No. 6,448,253 and U.S. application Ser. No. 10/211,0961A. Mn = 21 kg/mol, PDI = 2.63, 47/5/48 ODMA/C4/$^t$BMA by weight. |
| ODMA-b-C4-b-MAn | An ABC triblock copolymer, poly[octadecyl methacrylate-b-2-(N-methylperfluorobutanesulfonamido)ethyl methacrylate-b-methacrylic anhydride]. Synthesized from ODMA-b-C4-tBMA as described in U.S. patent application Ser. No. 10/211,096. |
| PS-MAn | An AB diblock copolymer, poly[styrene-b-methacrylic anhydride]. Synthesized using a stirred tubular reactor process as described in U.S. Pat. No. 6,448,253 and U.S. application Ser. No. 10/211,415. Mn = 125 kg/mol, PDI = 2.07, 96/4 PS/MAn by weight. |
| PS-PVP | An AB diblock copolymer, poly[styrene-b-4-vinylpyridine]. Synthesized using a stirred tubular reactor process as described in U.S. Pat. No. 6,448,253. Mn = 25 kg/mol, PDI = 2.24, 95/5 PS/PVP by weight. |
| Polybond 3009 | A maleated-polyethylene (~1 wt % maleic anhydride) commercially available from Crompton Co., Middlebury, CT. |
| FX-5911 | A fluoropolymer based processing aid, commercially available from Dyneon LLC, Oakdale, MN. |
| PA-5933 | A fluoropolymer additive, commercially available from Dyneon LLC, Oakdale, MN. |
| FX-9613 | A fluoropolymer based processing aid, commercially available from Dyneon LLC, Oakdale, MN. |

Test Methods

Tensile and Flexural Property Characterization

Test specimens were injection molded to specified dimensions as described below in the examples section. Tensile and flexural testing was subsequently performed on each sample using an Instron 5564 universal materials tester (commercially available from Instron Corporation, Canton, Mass.) as described in ASTM D1708 and D790, respectively. All samples were performed in triplicate.

Water Uptake Test

Injection molded samples (5"×1"×0.25") of each test specimen were weighed and submerged in a container filled with deionized water for 720 hours. The resulting samples were removed from the container blotted dry to the touch and reweighed. The mass difference was utilized to determine the % water uptake. Each sample was run in duplicate and the average reported.

Composite Extrusion

Trial composite extrusion was carried out using a 19 mm, 15:1 L:D, Haake Rheocord Twin Screw Extruder (commercially available from Haake Inc., Newington, N.H.) equipped with a conical counter-rotating screw and a Accurate open helix dry material feeder (commercially available from Accurate Co. Whitewater, Wis.). The extrusion parameters were controlled and experimental data recorded using a Haake RC 9000 control data computerized software (commercially available for Haake Inc., Newington, N.H.). Materials were extruded through a standard ⅛" diameter, 4-strand die (commercially available from Haake Inc., Newington, N.H.).

Comparative Example 1

Extrusion of 60/40 HDPE/Wood Flour Composite

Wood flour (800 g) was first pre-dried in a vacuum oven for 16 hr at 105° C. and ~1 mmHg. HDPE (1200 g) was then dry mixed with the wood flour in a plastic bag until a relatively uniform mixture was achieved, and the blend was placed into the dry powder feeder. The material was fed into the extruder at a rate of 20 g/min (shear rate ~30 s$^{-1}$) and was processed using the following temperature profile in each respective zone: 160° C./180° C./180° C./190° C. The die was also kept at 190° C. throughout the experiment. Processing parameters (i.e., melt pressure, torque) were recorded throughout the experiment. The resulting material was collected and visually analyzed.

Comparative Example 2

Extrusion of 60/40 HDPE/Wood Flour Composite with a Lubricant Package

The experiment was prepared exactly as detailed in Comparative Example 1, with the exception that a 80 g of a lubricant package, consisting of 50 parts zinc stearate and 50 parts ethylene bis-stearamide was added to the formulation.

Comparative Examples 3-4

Extrusion of 60/40 HDPE/Wood Flour Composite a Coupling Agent

In Comparative Example 3, prior to the experiment, a masterbatch containing 95 parts HDPE and 5 parts poly(ODMA-C4-MAn) was made in the following fashion. HDPE (475 g) was dry mixed with poly(ODMA-C4-$^t$BMA) (25 g) in a plastic bag until a relatively uniform mixture was achieved, and the blend was placed into the dry powder feeder. The material was fed into the extruder at a rate of 20 g/min (shear rate ~30 s$^{-1}$) and was processed using the following temperature profile in each respective zone: 200° C./240° C./240° C./240° C. The die was also kept at 240° C. throughout the experiment. The extruded strand was immediately cooled in a RT water bath and subsequently chopped into pellets using a Killion pelletizer. This masterbatch (200 g) was combined with HDPE (400 g) and pre-dried wood flour (400 g) and then dry mixed in a plastic bag until a relatively uniform mixture was achieved, and the blend was placed into the dry powder feeder. The material was fed into the extruder at a rate of 20 g/min (shear rate ~30 s$^{-1}$) and was processed using the following temperature profile in each respective zone: 160° C./180° C./180° C./190° C. The die was also kept at 190° C. throughout the experiment. Processing parameters (i.e., melt pressure, torque) were recorded throughout the experiment. The resulting material was collected and visually analyzed.

Comparative Example 4 was made in an identical fashion to comparative example 3 with the exception that the initial masterbatch was made using 100 g Polybond 3009 in place of ODMA-C4-MAn and 900 g HDPE and 400 g of it was combined with 200 g HDPE and 400 g dried wood flour in the composite formulation.

Comparative Example 5

Extrusion of 60/40 HDPE/Wood Flour Composite with a Polymer Processing Aid

Comparative example 5 was prepared exactly as detailed in Comparative Example 1, with the exception that 10,000 ppm of a polymer processing aid, Dynamar FX-5911, were respectively added to the formulation.

Example 1-2

Extrusion of 60/40 HDPE/Wood Flour Composite with a Polymer Processing Aid, and Coupling Agent Example 1 was performed exactly as detailed in Comparative Example 4, with the exception that 1 g Dynamar FX-5911 was added to the formulation.

Example 2 was prepared exactly as detailed in Example 1 with the exceptions that 10 g of PS-b-MAn and 10 g of Dyneon PA-5933 were used in place of Polybond 3009 and Dynamar FX-5911, respectively and 40 g of Carbowax 8000 were also added to the formulation.

Example 3

Extrusion of 60/40 HDPE/Wood Flour Composite with a Polymer Processing Aid, Lubricant, and Coupling Agent Example 3 was prepared exactly as detailed in Comparative Example 3, with the exception that 400 g of the masterbatch was combined 200 g of HDPE and 400 g of wood flour. Additionally, 1 g Dynamar PA-5933 and 40 g of Carbowax 8000 were also added to the formulation.

A summary of the formulations examined is given in Table 1.

TABLE 1

Summary of Formulations for Comparative Examples 1-5 and Examples 1-3 (given in approximate parts per hundred by weight)

| Component | CE 1 | CE 2 | CE 3 | CE 4 | CE 5 | Ex 1 | Ex 2 | Ex 3 |
|---|---|---|---|---|---|---|---|---|
| HDPE | 60 | 60 | 60 | 60 | 60 | 60 | 60 | 60 |
| Wood Flour | 40 | 40 | 40 | 40 | 40 | 40 | 40 | 40 |
| Carbowax 8000 | — | — | — | — | — | — | 2 | 2 |
| Lubricant | — | 4 | — | — | — | — | — | — |
| PS-b-MAn | — | — | — | — | — | — | 0.5 | — |
| ODMA-b-C4-b-MAn | — | — | 1 | — | — | — | — | 2 |
| Polybond 3009 | — | — | — | 4 | — | 4 | — | — |
| Dyneon PA-5933 | — | — | — | — | — | — | 0.5 | 0.5 |
| Dynamar FX-5911 | — | — | — | — | 1.0 | 0.1 | — | — |

Table 2 summarizes the processing results obtained for Comparative Examples 1-5 and Examples 1-3. The results demonstrate the utility of the present invention.

TABLE 2

Summary of Processing Results for Comparative Examples 1-5 and Examples 1-2

| Example | Melt Pressure (PSI) | Torque (mg) | Melt Fracture |
|---|---|---|---|
| CE 1 | 1500 | 2900 | yes |
| CE 2 | 1375 | 1925 | yes |
| CE 3 | 1400 | 2750 | yes |
| CE 4 | 1550 | 3300 | yes |
| CE 5 | 1400 | 1850 | yes |
| 1 | 1000 | 2000 | yes |
| 2 | 1650 | 3300 | no |
| 3 | 850 | 1000 | no |

Comparative Example 6

Extrusion of LLDPE Containing 3000 ppm HALS with a Polymer Processing Aid

A masterbatch of HALS (3% in LLDPE, 200 g), Dynamar FX-9613 (2.8% in LLDPE, 93 g) and LLDPE (1707 g) were dry blended in a plastic bag until a relatively uniform mixture was achieved, and the blend was placed into the dry pellet/powder feeder. The material was fed into the extruder at a rate of 66 g/min (shear rate ~115 s$^{-1}$) and was processed using the following temperature profile in each respective zone: 190° C./190° C./190° C./190° C. The die was also kept at 190° C.

throughout the experiment. Processing parameters (i.e., melt pressure, torque) were recorded throughout the experiment. The resulting material was collected and visually analyzed for the presence of melt fracture.

Example 4

Extrusion of LLDPE Containing 3000 ppm HALS, Processing Aid, and Coupling Agent

A masterbatch of HALS (3% in LLDPE, 200 g), PS-MAn (3.0% in LLDPE, 667 g) Dynamar FX-9613 (2.8% in LLDPE, 93 g), and LLDPE (1040 g) were dry blended in a plastic bag until a relatively uniform mixture was achieved, and the blend was placed into the dry pellet/powder feeder. The material was fed into the extruder at a rate of 66 g/min (shear rate ~115 s$^{-1}$) and was processed using the following temperature profile in each respective zone: 190° C./190° C./190° C./190° C./190° C. The die was also kept at 190° C. throughout the experiment. Processing parameters (i.e., melt pressure, torque) were recorded throughout the experiment. The resulting material was collected and visually analyzed for the presence of melt fracture.

Comparative Example 7

Extrusion of LLDPE Containing 15000 ppm Antiblock with a Polymer Processing Aid

A masterbatch of antiblock (60% in LLDPE, 50 g), Dynamar FX-9613 (2.8% in LLDPE, 93 g) and LLDPE (1857 g) were dry blended in a plastic bag until a relatively uniform mixture was achieved, and the blend was placed into the dry pellet/powder feeder. The material was fed into the extruder at a rate of 66 g/min (shear rate ~115 s$^{-1}$) and was processed using the following temperature profile in each respective zone: 190° C./190° C./190° C./190° C. The die was also kept at 190° C. throughout the experiment. Processing parameters (i.e., melt pressure, torque) were recorded throughout the experiment. The resulting material was collected and visually analyzed for the presence of melt fracture.

Example 5

Extrusion of LLDPE Containing 15000 ppm Antiblock, Polymer Processing Aid, and Coupling Agent A masterbatch of antiblock (60% in LLDPE, 50 g), PS-MAn (3.0% in LLDPE, 667 g) Dynamar FX-9613 (2.8% in LLDPE, 93 g), and LLDPE (1190 g) were dry blended in a plastic bag until a relatively uniform mixture was achieved, and the blend was placed into the dry pellet/powder feeder. The material was fed into the extruder at a rate of 66 g/min (shear rate ~115 s$^{-1}$) and was processed using the following temperature profile in each respective zone: 190° C./190° C./190° C./190° C. The die was also kept at 190° C. throughout the experiment. Processing parameters (i.e., melt pressure, torque) were recorded throughout the experiment. The resulting material was collected and visually analyzed for the presence of melt fracture.

Comparative Example 8

Extrusion of LLDPE Containing 6000 ppm Pigment with a Polymer Processing Aid

A masterbatch of Dynamar FX-9613 (2.8% in LLDPE, 93 g), Pigment (12.0 g) and LLDPE (1895 g) were dry blended in a plastic bag until a relatively uniform mixture was achieved, and the blend was placed into the dry pellet/powder feeder. The material was fed into the extruder at a rate of 66 g/min (shear rate ~115 s$^{-1}$) and was processed using the following temperature profile in each respective zone: 190° C./190° C./190° C./190° C. The die was also kept at 190° C. throughout the experiment. Processing parameters (i.e., melt pressure, torque) were recorded throughout the experiment. The resulting material was collected and visually analyzed for the presence of melt fracture.

Example 6

Extrusion of LLDPE Containing 6000 ppm Pigment, Polymer Processing Aid, and Coupling Agent A masterbatch of PS-MAn (3.0% in LLDPE, 667 g) Dynamar FX-9613 (2.8% in LLDPE, 93 g), Pigment (12.0 g) and LLDPE (1228 g) were dry blended in a plastic bag until a relatively uniform mixture was achieved, and the blend was placed into the dry pellet/powder feeder. The material was fed into the extruder at a rate of 66 g/min (shear rate ~115 s$^{-1}$) and was processed using the following temperature profile in each respective zone: 190° C./190° C./190° C./190° C. The die was also kept at 190° C. throughout the experiment. Processing parameters (i.e., melt pressure, torque) were recorded throughout the experiment. The resulting material was collected and visually analyzed for the presence of melt fracture.

A summary of the formulations for comparative examples 6-8 and examples 4-6 is given in Table 3. Composite formulations were made using standard extrusion processes. Throughout these experiments, the torque and melt pressure were monitored. The overall level of melt fracture of the sample produced was also noted.

TABLE 3

Summary of Formulations for Comparative Examples 6-8 and Examples 4-6 (given in approximate parts per million by weight in LLDPE)

| Component | CE 6 | CE 7 | CE 8 | Ex 4 | Ex 5 | Ex 6 |
|---|---|---|---|---|---|---|
| HALS | 3000 | — | — | 3000 | — | — |
| Antiblock | — | 15000 | — | — | 15000 | — |
| Pigment | — | — | 6000 | — | — | 6000 |
| PS-b-MAn | — | — | — | 10000 | 10000 | 10000 |
| Dynamar FX-9613 | 500 | 500 | 500 | 500 | 500 | 500 |

Table 4 summarizes the processing results obtained for Comparative Examples 6-8 and Examples 4-6.

TABLE 4

Summary of Processing Results for Comparative Examples 6-8 and Examples 4-6

| Example | Melt Pressure (PSI) | Torque (mg) | % Melt Fracture after 30 min |
|---|---|---|---|
| CE 6 | 2025 | 5875 | 50 |
| CE 7 | 2025 | 5900 | 25 |
| CE 8 | 1750 | 5450 | 15 |
| 4 | 1900 | 5500 | 15 |
| 5 | 1900 | 5200 | 5 |
| 6 | 1925 | 5150 | 5 |

As can be seen from this table, the addition of a coupling agent in combination with a PPA substantially reduces % melt fracture after 30 minutes processing.

An additional advantage of the invention described here is that the many of the composite compositions described have improved physical properties. This is exemplified in Examples 7-8.

Example 7-8

Extrusion of 60/40 HDPE/Wood Flour Composite with a Coupling Agent and a Polymer Processing Aid Example 7. Wood flour (800 g) was first pre-dried in a vacuum oven for 16 hr @105° C. @~1 mmHg. HDPE (1200 g), PS-b-PVP (40 g), and Dynamar FX-5911 (1 g) were then dry mixed with the wood flour in a plastic bag until a relatively uniform mixture was achieved, and the blend was placed into the dry powder feeder. The material was fed into the extruder at a rate of 20 g/min (shear rate ~30 s$^{-1}$) and was processed using the following temperature profile in each respective zone: 210° C./180° C./180° C./180° C. The die was also kept at 180° C. throughout the experiment. Processing parameters (i.e., melt pressure, torque) were recorded throughout the experiment. The resulting material was collected and visually analyzed.

The resulting pellets were injection molded into test specimens using a Cincinnati-Milacron-Fanuc Roboshot 110 R injection molding apparatus equipped with a series 16-I control panel (commercially available from Milacron Inc., Batavia, Ohio). The following experimental parameters were utilized. injection speed=120 mm/s, pack step=800 kg/cm$^2$, step second: 6.0, shot size=42 mm, decompression distance=20 mm, decompression velocity=6.3 mm/s, cooling time=20.0 s, back pressure=80 kg/cm$^2$, screw speed=60 rpm, cycle time=30 s, mold temperature=100° F., extruder zone temperatures=210° C., 210° C., 200° C., 200° C. In all cases, the first 10 shots were discarded. The remaining samples were tested for tensile and flexural properties.

Example 8 was performed exactly as described in Example 7, with the exception that PS-b-MAn was utilized in the place of PS-b-PVP.

Table 5 summarizes the compositions examined in Examples 7-8. Table 6 gives the flexural and tensile properties of these wood composite compositions 2, 7, and 8. This table also provides flexural and tensile properties for a lubricated wood composite formulation previously described (Comparative Example 2)

TABLE 5

Summary of Formulations Examples 7-8 (given in approximate parts per hundred by weight)

| Component | 7 | 8 |
|---|---|---|
| HDPE | 60 | 60 |
| Wood Flour | 40 | 40 |
| PS-b-PVP | 2 | — |
| PS-b-Man | — | 2 |
| Dynamar FX-5911 | 0.5 | 0.05 |

TABLE 6

Summary of Flexural and Tensile Properties for Comparative Example 2 and Examples 2, 7, and 8.

| Example | Tensile Strength (MPa) | Elongation at Break (%) | Flexural Modulus (MPa) | % Water Uptake | Melt Fracture |
|---|---|---|---|---|---|
| CE 2 | 30.3 | 8.2 | 1845 | 3.6 | Yes |
| 2 | 39.3 | 7.6 | 2440 | 1.7 | No |
| 7 | 35.8 | 8.5 | 2215 | 1.6 | No |
| 8 | 37.0 | 8.1 | 2352 | 1.6 | No |

As is seen from this table, a >30% improvement in flexural and tensile properties and a >200% improvement in water uptake is observed for Examples 2, 7, and 8 when compared to Comparative Example 2.

From the above disclosure of the general principles of the present invention and the preceding detailed description, those skilled in this art will readily comprehend the various modifications to which the present invention is susceptible. Therefore, the scope of the invention should be limited only by the following claims and equivalents thereof.

What is claimed is:

1. A composition comprising:
   (a) a polymeric binder,
   (b) a cellulosic interfering component,
   (c) a coupling agent, said coupling agent being an amphiphilic block copolymer having a controlled polymer architecture and selected from the group consisting of polystyrene-b-methacrylic anhydride, polystryrene-b-4-vinylpyridine, polyisoprene-b-methacrylic anhydride, polyisoprene-b-4-vinylpyridine, polybutadiene-b-methacrylic anhydride, polybutadiene-b-4-vinylpyridine, polyethylene-b-methacrylic anhydride, polyethylene-b-4-vinylpyridine, polyethylene-propylene-b-methacrylic anhydride, polyethylene-propylene-b-4-vinylpyridine, polystearylmethacrylate-b-methacrylic anhydride, polybehenylmethacrylate-b-4-vinylpyridine, polybehenylmethacrylate-b-methacrylic anhydride, polybehenylmethacrylate-b-4-vinylpyridine, maleated-polyethylene, maleated-polypropylene, polyethylene-acrylic acid copolymers, polypropylene-acrylic acid copolymers and combinations thereof; and
   (d) a polymer processing aid,
wherein upon melt-processing with a polymeric binder and a cellulosic interfering component, said coupling agent is capable of reducing interfacial tension between said polymeric binder and said interfering component.

2. The composition of claim 1, wherein said polymer processing aid is polytetrafluoroethylene.

3. The composition of claim 1, wherein said polymer processing aid is derived from homopolymers or copolymers or vinylidene fluoride, hexafluoropropylene, and tetrafluoroethylene.

4. The composition of claim 1, wherein said polymeric binder is polyethylene, and upon melt processing, said composition having at least one of a water uptake value of 3% or less, a flexural modulus of 2200 MPa or greater, or a tensile strength of 36 MPa or greater.

5. The composition of claim 1, further comprising an antimicrobial composition.

6. The composition of claim 5, wherein the antimicrobial composition is one of thiabendazole, 2-(4-thiazolyl)benzimidazol, zinc pyrithione, zinc bis(2-pyridinethiol-1-oxide), zinc borate, barium metaborate, N-butyl-1,2-benzisothiazolin-3-one, 2-n-Octyl-4-isothiazolin-3-one, tetrachloroisophthalonitrile, 10,10'-Oxybisphenoxyarsine, N'-dichlorofluoromethylthio-N,N-dimethyl-N'(p-tolyl)-sulfamide, N-(trichloromethylthio)phthalimide, and 3-iodo-2-propynyl-n-butylcarbamate.

7. A method for forming an article, comprising melt-processing the composition of claim 1.

8. The method of claim 7, wherein the composition does not exhibit melt fracture upon melt-processing.

9. The method of claim 7, wherein said melt-processing includes extrusion, injection molding, batch mixing, and rotomolding.

10. The method of claim 7, wherein said composition has at least one of a water uptake value of 3% or less, a flexural modulus of 2200 MPa or greater, or a tensile strength of 36 MPa or greater.

11. The method of claim 10, wherein said method is utilized to form building materials and automotive components.

12. The composition of claim 1 further comprising an antimicrobial selected from the group consisting of thiabendazole, 2-(4-thiazolyl)benzimidazol, zinc pyrithione, zinc bis(2-pyridinethiol-1-oxide), zinc borate, barium metaborate, N-butyl-1,2-benzisothiazolin -3-one, 2-n-Octyl-4-isothiazolin-3-one, tetrachloroisophthalonitrile, 10,10'-Oxybisphenoxyarsine, N'-dichlorofluoromethylthio-N,N-dimethyl-N'(p-tolyl)-sulfamide, N-(trichloromethylthio) phthalimide, and 3-iodo-2-propynyl-n-butylcarbamate.

\* \* \* \* \*

UNITED STATES PATENT AND TRADEMARK OFFICE
CERTIFICATE OF CORRECTION

PATENT NO.        : 8,236,874 B2
APPLICATION NO.   : 12/176900
DATED             : August 7, 2012
INVENTOR(S)       : James M Nelson et al.

It is certified that error appears in the above-identified patent and that said Letters Patent is hereby corrected as shown below:

Column 6
Line 37, Delete "polyoxyalylene," and insert -- polyoxyalkylene, --, therefor.

Column 7
Line 5, Delete "polystryrene" and insert -- polystyrene --, therefor.

Column 7
Line 64, Delete "benzimidazol," and insert -- benzimidazole, --, therefor.

Column 7-8
Line 67 (Col. 7) and Line 1 (Col. 8), Delete "Oxybisphenoxyarsine," and insert -- Oxybisphenoxarsine, --, therefor.

Column 8
Line 67, Delete "applications" and insert -- applications. --, therefor.

Column 15
Line 50 (Approx.), Delete "Example 2)" and insert -- Example 2). --, therefor.

Column 16
Line 31, In Claim 1, delete "polystyrene-b -methacrylic" and insert -- polystyrene-b-methacrylic --, therefor.

Column 16
Line 31, In Claim 1, delete "polystryrene" and insert -- polystyrene --, therefor.

Column 16
Line 36, In Claim 1, delete "polyethylene-b -4-vinylpyridine," and insert -- polyethylene-b-4-vinylpyridine, --, therefor.

Signed and Sealed this
Nineteenth Day of February, 2013

Teresa Stanek Rea
*Acting Director of the United States Patent and Trademark Office*

CERTIFICATE OF CORRECTION (continued)
U.S. Pat. No. 8,236,874 B2

Column 16
Line 39, In Claim 1, after "anhydride," insert -- polystearylmethacrylate-b-4-vinylpyridine, --.

Column 16
Lines 39-40, In Claim 1, delete "-b-4-vinylpyridine, polybehenylmethacrylate-b-methacrylic" and insert -- b-methacrylic --, therefor.

Column 16
Lines 64-65, In Claim 6, delete "benzimidazol," and insert -- benzimidazole, --, therefor.

Column 17
Line 1, In Claim 6, delete "Oxybisphenoxyarsine," and insert -- Oxybisphenoxarsine, --, therefor.

Column 18
Line 5 (Approx.), In Claim 12, delete "benzimidazol," and insert -- benzimidazole, --, therefor.

Column 18
Line 10, In Claim 12, delete "Oxybisphenoxyarsine," and insert -- Oxybisphenoxarsine, --, therefor.